June 24, 1930.  R. G. SELLON  1,766,004
TRACTOR GUIDE
Filed Oct. 18, 1928   2 Sheets-Sheet 1
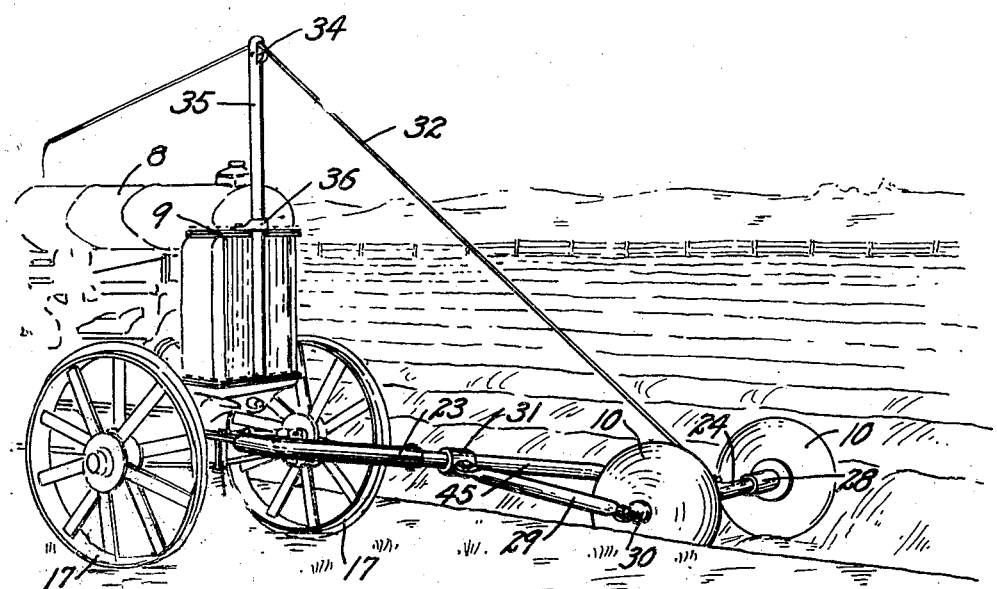
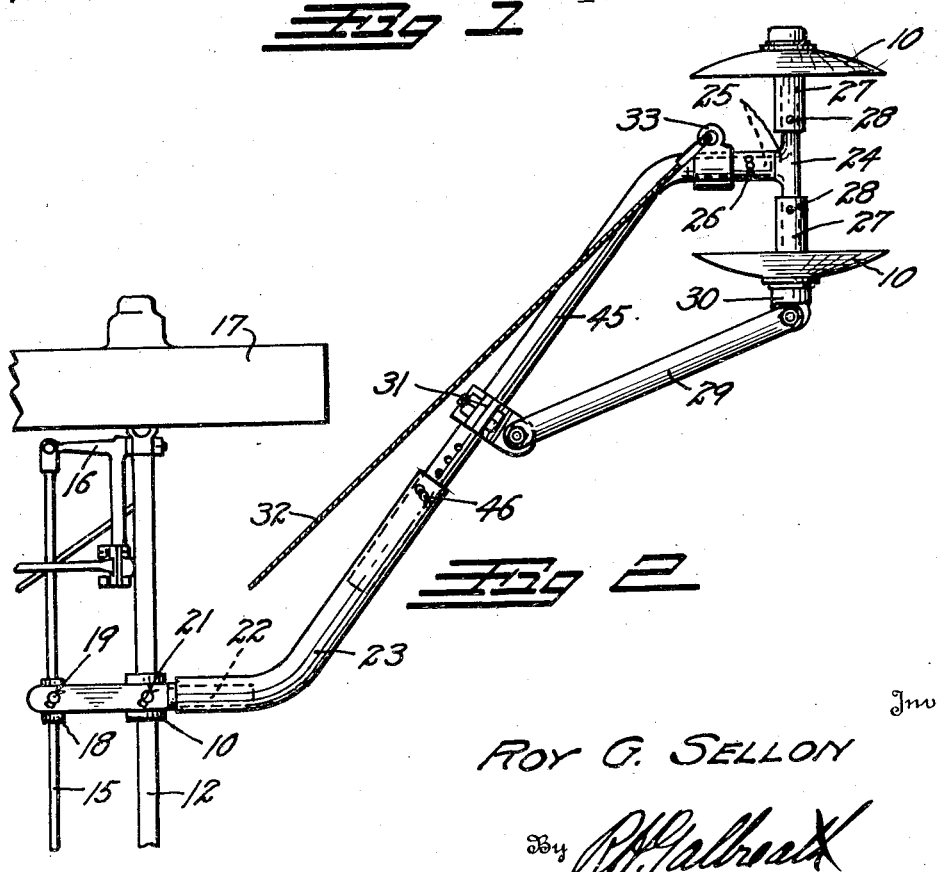
Inventor
ROY G. SELLON
By R. H. Galbraith
Attorney June 24, 1930.   R. G. SELLON   1,766,004
TRACTOR GUIDE
Filed Oct. 18, 1928   2 Sheets-Sheet 2

Inventor
Roy G. Sellon

Patented June 24, 1930

1,766,004

UNITED STATES PATENT OFFICE

ROY G. SELLON, OF HUGO, COLORADO, ASSIGNOR OF ONE-HALF TO ARTHUR M. SELLON, OF RANDOLPH, NEBRASKA

TRACTOR GUIDE

Application filed October 18, 1928. Serial No. 313,237.

This invention relates to a device for automatically guiding and steering tractors along the furrows or ridges in plowing, listing, or cultivating operations, and has for its principal object the provision of an efficient device of this character which can be quickly and easily placed upon the tractor when needed without the use of tools.

Another object of the invention is to provide a tractor guide for plowing and listing which can be instantly reversed to either side of the tractor so that the tractor can return along the same furrow.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 illustrates my improved tractor guide in use for plowing.

Fig. 2 is a plan view of the guide arranged for plowing or listing.

Figures 3, 4, 5:
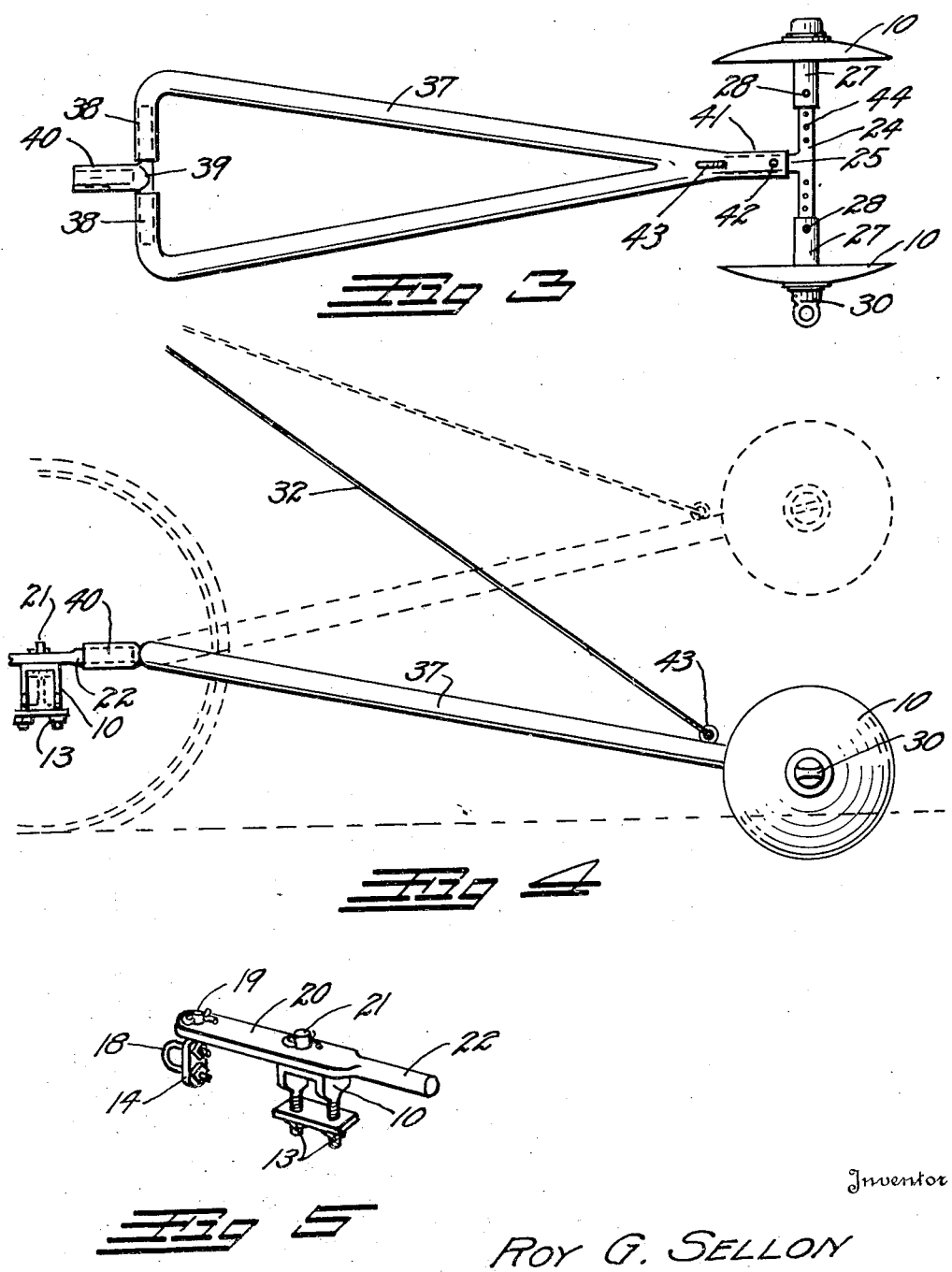
Fig. 3 is a plan view illustrating my improved guide arranged for cultivating operations.
Fig. 4 is a side elevation of the guide of Fig. 3, illustrating how it may be raised when not in use.
Fig. 5 is a detail perspective view of a tractor axle attachment for supporting the guide mechanism.

In the drawing a tractor is illustrated at 8, its radiator at 9, front axle 12, steering rod 15, steering arms 16, front wheels 17.

For plowing or cultivating the guide is similarly attached to the tractor and is similar in operation. The two arrangements differ only in that for plowing the guide employs a supporting arm which positions the guide discs to one side of the tractor while the supporting arm for cultivating supports the discs immediately ahead of the tractor.

The invention may be attached to the tractor in any desired manner so as to impart movement to the tractor steering rod 15. One method of attachment is illustrated in detail in Fig. 5 and comprises an axle clamp 11 adapted to be attached to the front axle 12 of the tractor by means of clamp nuts 13. The axle clamp 10 supports a guide bar 20 upon a pivot stud 21 formed on the clamp 10.

The guide bar 20 connects with a steering rod clamp 14, through a second pivot stud 19. The steering rod clamp 14 is arranged to be clamped to the steering rod 15 of the tractor by means of a U-bolt 18, so that any movement of the guide bar 20 about its pivot 21 will be communicated to the steering rod 15.

The clamp arrangement illustrated can be varied to suit the various steering mechanisms of different tractors. The forward extremity of the guide bar 20 is rounded to form an attachment stud 22.

The guiding or steering action is obtained by a pair of convex guide discs 10 which rotate upon sleeve bearings 27. The sleeve bearings 27 slip over the extremities of a T-shaped shaft member 24 and are held in place thereon by means of pins 28 which pass through the bearings 27 and any one of a series of openings 44 formed in the shaft 24.

The stem 25 of the T-shaped shaft member 24 is arranged to be inserted in the extremity of a guide arm 45, when it is desired to place the discs 10 to one side of the tractor as illustrated in Fig. 1, or in the extremity of a cultivating guide arm 37 when it is desired to position the discs immediately ahead of the tractor.

For plowing, listing or similar operations where it is desired to run the tractor alongside of the furrow, the arrangement illustrated in Figs. 1 and 2 is employed. In this arrangement a bent, guide arm socket 23 is slipped over the attachment stud 22. The socket 23 telescopically receives a guide arm 45 which fits over the stem 25 of the T-shaped shaft 24. The guide arm 45 is secured in the socket 23 by means of a pin 46 and to the stem 25 by means of a pin 26.

The shaft 24 is braced from the supporting arm 23 by means of a brace bar 29 extending between a bearing cap 30 on one of the sleeve bearings 27 and an arm clamp 31 on the guide arm 45. By adjusting the clamp 31 along the arm 45 the angle of the shaft 24 can be aligned to cause the discs 10 to travel in the desired direction along the furrow.

A cable 32 extends from a ring 33 on the guide arm 45 over a pulley 34 to the operator. The pulley 34 is carried in the standard 35 that is supported on the front of the radiator of the tractor 9 by means of a band 36.

In use, the discs 10 are set in the previously plowed furrow and the tractor is started. The discs will follow the furrow and steer the tractor and guide the plow along the land side of the previous furrow until the extremity of the field is reached.

The operator then draws upon the cable 32 lifting the discs 10 from the furrow and turns the tractor and plow. For return plowing he may, by means of the cable 32, swing the entire guide mechanism over to the other side of the tractor, the socket 23 rotating upon the stud 22, set his other plow and return along the furrow with the discs 10 projecting from the opposite side of the tractor.

The spacing of the furrows can be adjusted as desired by sliding the guide arm 45 into and out of the socket 23, a series of holes being provided in the arm to receive the pin 46 at any desired degree of extension.

It will be noted that the guide mechanism can be lifted and reversed by the operator from his position on the tractor so that backward and forward plowing can be accomplished without it being necessary for the operator to dismount.

For cultivating operations where it is desired that the tractor straddle the furrow or the ridges, a listing arm 37 such as illustrated in Figs. 3 and 4, is employed in place of the socket 23 and arm 45.

The arm 37 is formed of tubing or pipe in a closed V-shaped design, the extremities of the V being turned inwardly as shown at 38 to engage the opposite extremities of a T-shaped hinge member 39. The stem of the hinge member 39 comprises a sleeve 40 arranged to be slipped over the stud 22 of the guide bar 20. The apex of the V is provided with a socket 41, into which the stem 25 of the disc shaft 24 is slipped and secured in place by means of the pin 42. A ring 43 is provided for attachment of the cable 32.

It will be seen that by this construction the discs 10 are caused to travel immediately ahead of the tractor and follow either a furrow or ridge between its wheels. At the extremities of the field the guide can be raised, as indicated in Fig. 4, by means of the cable 32 to allow the tractor to be turned.

When using the mechanism to follow a ridge or row in cultivating it is preferred to remove and reverse the discs 10 so that their convex sides will project inwardly. In this position they have no tendency to climb the ridge. In following a furrow, however, the discs should be faced with their convex sides outwardly so that they will have no tendency to climb out of the furrow. The separation of the discs 10 can be varied by changing the positions of the pins 28 in a series of holes 44 in the shaft 24, so that any desired width of furrow or ridge can be closely followed.

The mechanism acts to direct the tractor by turning the guide bar 20 upon its pivot 21 on the axle. Any sidewise movement of the mechanism is thus transmitted to the steering rod 15 which in turn actuates the front wheels 17 to direct the tractor in the proper direction.

The guide bar 20 and the clamps 10 and 14 can be left permanently upon the tractor as they do not interfere with its use in any way. Then when the guide mechanism is required it can be slipped over the projecting stud 22 without the use of any tools or attachment means.

The retaining band 36 can also be left permanently upon the tractor and the standard 35 can be dropped into place when desired. The lower extremity of the standard 35, which is a hollow pipe, usually finds one of the lower bolt heads in the radiator 9 to fit over to maintain it in the vertical position.

While a specific form of the improvement has been described and illustrated herein, it is desired to be understood that the same may be varied, within the scope of the appended claims, without departing from the spirit of the invention.

Having thus described the invention, what I claim and desire secured by Letters Patent is:—

1. A guide mechanism for tractors comprising: a fixed pivot; a second pivot adapted to be secured to the steering rod of said tractor; a guide bar extending between said pivots and forwardly therefrom; a stud projecting forwardly from guide bar; a hinge member adapted to fit over said stud; a supporting arm hinged to said hinge member and extending forwardly therefrom; and guide discs carried adjacent the forward extremity of said supporting arm, said hinge member comprising: a T-shaped member, said supporting arm adapted to rotatably engage the extremities of said T-shaped member; and means for raising the forward extremity of said supporting arm.

2. A guide mechanism for tractors comprising: a forwardly extending guide bar arranged to be swung in a horizontal arc by the steering rod of a tractor; a socket member arranged to pass over and rotate upon the forward extremity of said guide bar; studs extending oppositely outward from said socket member; a V-shaped arm, the extremities of said V being turned inwardly to pass over and rotate upon said studs; guide wheels supported from the apex of said V-shaped arm; and means for elevating said arm.

3. A guide mechanism for tractors comprising: a forwardly extending guide bar arranged to be swung in a horizontal plane by the steering rod of a tractor; a socket member arranged to pass over and rotate upon the forward extremity of said guide bar in a vertical lateral plane; studs extending oppositely outward from said socket; a V-shaped arm, the extremities of said V being turned inwardly to pass over and rotate upon said studs in a vertical, longitudinal plane; a T-shaped axle member, the stem of which is arranged to pass into the apex of said V-shaped arm; guide wheels carried on the lateral extremities of said T-shaped axle member; and means for elevating said V-shaped arm in said vertical, longitudinal plane.

4. A guide mechanism for tractors comprising: a forwardly extending guide bar arranged to be swung in a horizontal arc by the steering rod of a tractor; a socket member arranged to pass over and rotate upon the forward extremity of said guide bar; studs extending oppositely outward from said socket; a V-shaped arm, the extremities of said V being turned inwardly to pass over and rotate upon said studs and form a longitudinal hinge; a T-shaped axle member, the stem of which is arranged to pass into the apex of said V-shaped arm; guide wheels carried on the lateral extremities of said T-shaped axle member; means for elevating said V-shaped arm; sleeves carried by said discs and arranged to pass over the lateral extremities of said T-shaped axle member; and means for securing said sleeves in any desired position thereon.

In testimony whereof, I affix my signature.

ROY G. SELLON.